(12) United States Patent
Bhuyan et al.

(10) Patent No.: US 12,265,385 B2
(45) Date of Patent: Apr. 1, 2025

(54) SYSTEMS, DEVICES, AND METHODS FOR MILLIMETER WAVE COMMUNICATION FOR UNMANNED AERIAL VEHICLES

(71) Applicants: Battelle Energy Alliance, LLC, Idaho Falls, ID (US); North Carolina State University, Raleigh, NC (US)

(72) Inventors: Arupjyoti Bhuyan, Idaho Falls, ID (US); Ismail Guvenc, Cary, NC (US); Huaiyu Dai, Raleigh, NC (US)

(73) Assignees: Battelle Energy Alliance, LLC, Idaho Falls, ID (US); North Carolina State University, Raleigh, NC (US)

( * ) Notice: Subject to any disclaimer, the term of this patent is extended or adjusted under 35 U.S.C. 154(b) by 166 days.

(21) Appl. No.: 17/309,127

(22) PCT Filed: Nov. 5, 2019

(86) PCT No.: PCT/US2019/059900
§ 371 (c)(1),
(2) Date: Apr. 27, 2021

(87) PCT Pub. No.: WO2020/097103
PCT Pub. Date: May 14, 2020

(65) Prior Publication Data
US 2021/0373552 A1 Dec. 2, 2021

Related U.S. Application Data

(60) Provisional application No. 62/756,400, filed on Nov. 6, 2018.

(51) Int. Cl.
*G05D 1/00* (2024.01)
*H04W 4/40* (2018.01)

(52) U.S. Cl.
CPC ......... *G05D 1/0022* (2013.01); *G05D 1/0027* (2013.01); *H04W 4/40* (2018.02); *B64U 2201/20* (2023.01)

(58) Field of Classification Search
CPC .. G05D 1/0022; G05D 1/0027; B64C 39/024; H04W 4/40; H04W 4/70; B64U 2201/20
See application file for complete search history.

(56) References Cited

U.S. PATENT DOCUMENTS

| | | | |
|---|---|---|---|
| 2015/0142211 A1 | 5/2015 | Shehata et al. | |
| 2015/0301529 A1 | 10/2015 | Pillai et al. | |

(Continued)

FOREIGN PATENT DOCUMENTS

| | | |
|---|---|---|
| EP | 3276902 A1 | 1/2018 |
| IN | 201617027075 A | 8/2016 |

(Continued)

OTHER PUBLICATIONS

N. Rupasinghe, Y. Yapici, I. Güvenç and Y. Kakishima, "Non-orthogonal multiple access for mmWave drones with multi-antenna transmission," 2017 51st Asilomar Conference on Signals, Systems, and Computers, Pacific Grove, CA, USA, 2017, pp. 958-963, doi: 10.1109/ACSSC.2017.8335490. (Year: 2017).*

(Continued)

*Primary Examiner* — Kenneth J Malkowski
*Assistant Examiner* — Ibrahim Abdoalatif Alsomairy
(74) *Attorney, Agent, or Firm* — TraskBritt (57) ABSTRACT

Systems, devices, and methods are described for controlling, and communicating with, unmanned aerial vehicles (UAVs) over a millimeter wave (mmWave) communication network established between a base station and the UAVs. A communication system may include one or more unmanned aerial vehicles (UAVs). The communication system may further include one or more base stations including milli- (Continued)

meter wave (mmWave) antennas configured to generate control signals to the one or more UAVs over an mmWave communication network.

19 Claims, 6 Drawing Sheets

(56) References Cited

U.S. PATENT DOCUMENTS

| | | | |
|---|---|---|---|
| 2016/0131790 A1 | 5/2016 | Vowles | |
| 2016/0142292 A1* | 5/2016 | Au | H04L 5/0007 |
| | | | 370/352 |
| 2017/0039860 A1 | 2/2017 | Just | |
| 2017/0069214 A1* | 3/2017 | Dupray | G08G 5/0008 |
| 2017/0090483 A1 | 3/2017 | Smith et al. | |
| 2017/0140655 A1 | 5/2017 | Erickson et al. | |
| 2017/0276763 A1 | 9/2017 | Howard | |
| 2017/0299689 A1* | 10/2017 | Va | G01S 1/042 |
| 2017/0359106 A1 | 12/2017 | John Wilson et al. | |
| 2018/0024570 A1 | 1/2018 | Hutson | |
| 2018/0157250 A1* | 6/2018 | Barnickel | G05D 1/0033 |
| 2018/0375568 A1* | 12/2018 | De Rosa | H04W 72/04 |
| 2019/0236963 A1* | 8/2019 | High | G05D 1/104 |
| 2020/0037129 A1* | 1/2020 | Mezaael | H04W 4/029 |
| 2020/0395969 A1* | 12/2020 | Vardi | B64C 39/024 |

FOREIGN PATENT DOCUMENTS

| | | |
|---|---|---|
| WO | 2017/114501 A1 | 7/2017 |
| WO | 2017/149526 A2 | 9/2017 |
| WO | 2018/010808 A1 | 1/2018 |
| WO | 2018/035489 A1 | 2/2018 |

OTHER PUBLICATIONS

UAV Air-to-Ground Channel Characterization for mmWave Systems (Year: 2017).*
An Innovative Secure mmWave M2M Communication Network for Operating Drones (Year: 2019).*
International Search Report for International Application No. PCT/US19/59900, mailed Jan. 17, 2020, 2 pages.
International Written Opinion for International Application No. PCT/US19/59900, mailed Jan. 17, 2020, 6 pages.
Rupasinghe et al., "Non-Orthogonal Multiple Access for mmWave Drone Networks with Limited Feedback", (available at https://arxiv.org/abs/1801.04504), (Feb. 21, 2018), (v2), 32 pages.
Rupasinghe et al., "Non-Orthogonal Multiple Access for mmWave Drones with Multiple-Antenna Transmission", (available at https://arxiv.org/abs/1711.10050), (Jan. 14, 2018), (v2), 6 pages.

* cited by examiner

SYSTEMS, DEVICES, AND METHODS FOR MILLIMETER WAVE COMMUNICATION FOR UNMANNED AERIAL VEHICLES

PRIORITY CLAIM

This application is a national phase entry under 35 U.S.C. § 371 of International Patent Application PCT/US2019/059900, filed Nov. 5, 2019, designating the United States of America and published as International Patent Publication WO 2020/097103 A2 on May 14, 2020, which claims the benefit under Article 8 of the Patent Cooperation Treaty to U.S. Patent Application Ser. No. 62/756,400, filed Nov. 6, 2018.

STATEMENT REGARDING FEDERALLY SPONSORED RESEARCH OR DEVELOPMENT

The present disclosure was made with government support under Contract No. DE-AC07-05-ID14517 awarded by the United States Department of Energy. The government has certain rights in the present disclosure.

TECHNICAL FIELD

Embodiments of the present disclosure relate generally to communication systems and networks, and more specifically to systems, devices, and methods for millimeter wave communication for unmanned aerial vehicles.

BACKGROUND

The use of Unmanned Aerial Vehicles (UAVs) (e.g., drones) has been advancing rapidly for a large number of applications, particularly for non-military applications. Such applications may include emergency response, as well as a range of services from surveillance of remote critical infrastructure to air quality assessment. Non-limiting examples include public safety search and rescue of natural disaster victims, surveillance of remote critical infrastructure, surveys of environmental quality in protected regions, detection of threats during public events, among other applications. Within current regulatory policies, UAVs may have a flight radius limited by the line-of-sight (LOS) radio controllers used for signaling and control.

However, this distance limitation may be bypassed by using a commercial wireless service that provides adequate RF coverage to operate a UAV. This may be useful for applications in which autonomous flight is desirable. Drawbacks in the use of existing cellular RF coverage for UAV operation are appreciated: conventional cellular networks are designed for access from roads and structures on the Earth's surface, which may have RF coverage that is substantially weakened at about 400 feet high depending on the location; and interference of uplink from the UAV with base station communication with devices on the ground is more severe than among cellular devices on the ground because of the UAV's location above ground.

BRIEF SUMMARY

Some embodiments described herein include a communication system. A communication system may include one or more unmanned aerial vehicles (UAVs). The communication system may further include one or more base stations including millimeter wave (mmWave) antennas configured to generate and convey one or more control signals to the one or more UAVs over an mmWave communication network.

Additional embodiments of the disclosure include an unmanned aerial vehicle. An unmanned aerial vehicle may include a processor and communication elements configured to communicate with a base station over an mmWave communication network.

Other embodiments of the disclosure include a base station. A base station may include a first number of radio modules and antennas configured for communication with a number of unmanned aerial vehicles (UAVs) via an mmWave network. The base station may further include a second number of radio modules and antennas configured for communication with land-based communication devices via a radio-frequency (RF) network.

Additional embodiments of the disclosure include methods of operating a base station. A method may include establishing an mmWave communication link with an unmanned aerial vehicle (UAV). The method may further include transmitting one or more control signals to the UAV over the mmWave communication link to control operation of the UAV.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the present disclosure. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present disclosure is defined only by the accompanying claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

The "millimeter wave" (mmWave) frequencies generally refer to high frequency signals having wavelengths on the order of millimeters (mm), which may also be defined in terms of frequency. For example, the mmWave frequency spectrum may include a band of spectrum above 24 GHz. In some embodiments, the mmWave frequency spectrum includes bands between 24 GHz and 100 GHz, 24 GHz and 300 GHz, 30 GHZ and 300 GHz, and any other combination of frequencies defining a range above 24 GHz.

Various embodiments disclosed herein relate to millimeter wave communication networks including unmanned aerial vehicles (UAVs). More specifically, various embodiments of the disclosure are related to systems, networks, devices, and related methods for communicating with UAVs via Machine to Machine (M2M) communication using mmWave frequency bands, which may achieve secure communications for cellular-connected mmWave UAVs. Yet, more specifically, embodiments of the disclosure may include generating mmWave beams with antennas tilted upward for RF coverage (e.g., in the sky) to analyze the security, reliability, and/or spectral efficiency of a wireless network for UAV operation. For example, the antennas may include multiple-input multiple-output (MIMO) antennas configured to generate mmWave beams.

Further, various embodiments also include implementing non-orthogonal multiple access (NOMA) and/or rate-splitting multiple access (RSMA), and enabling intra-UAV communication among a plurality of UAVs. As a result, embodiments of the disclosure may provide improved radio-frequency (RF) coverage, security, reliability, spectral efficiency, reduced interference with neighboring users, and/or resiliency against cyberattacks in comparison to conventional networks and methods.

Figure 1A:
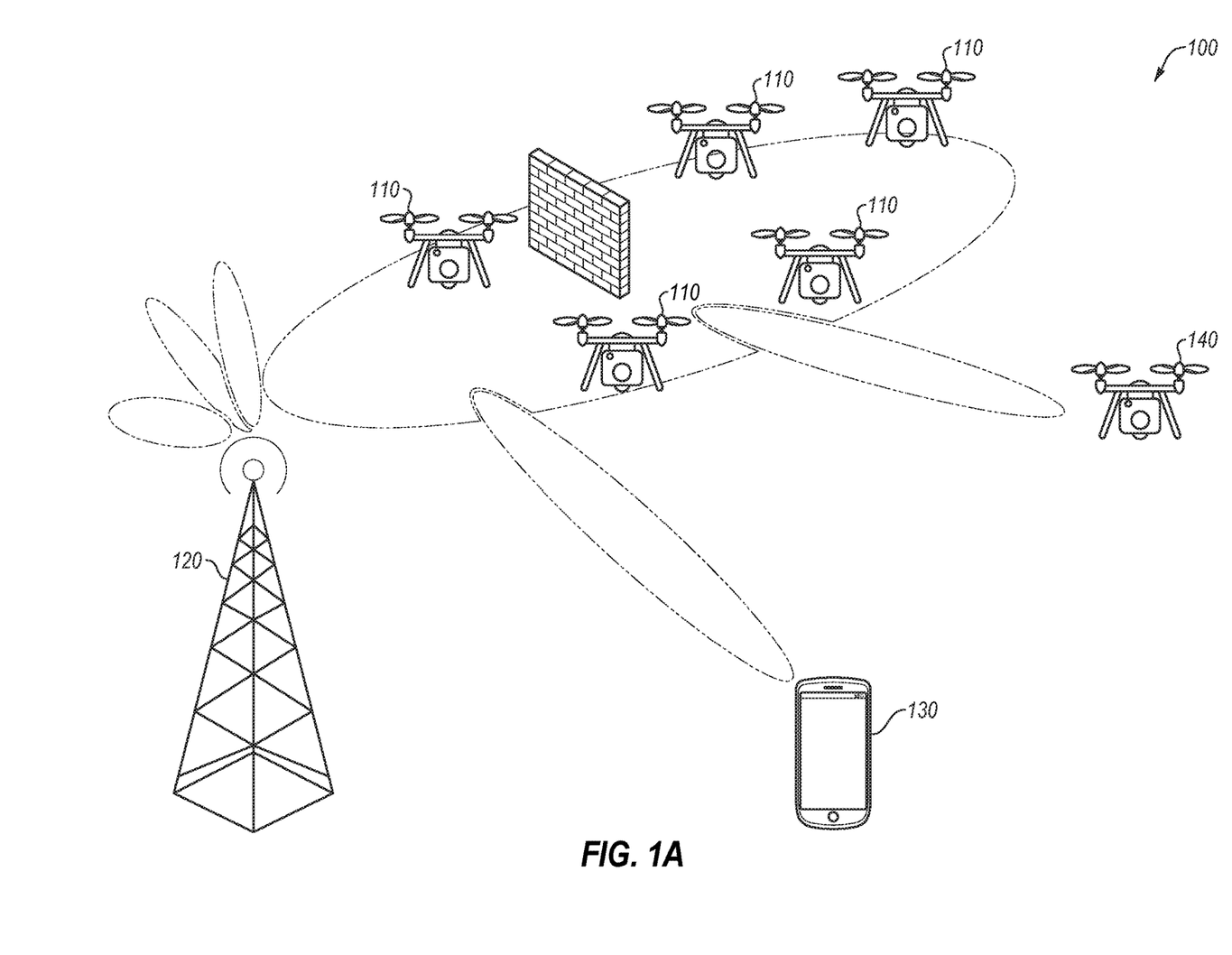
FIG. 1A depicts an example communication system configured to enable mmWave communication of one or more unmanned aerial vehicles, according to various embodiments of the present disclosure.

FIG. 1A depicts an example communication system 100 configured to enable mmWave communication of one or more UAVs 110, according to various embodiments of the present disclosure. The communication system 100 (also referred to herein as a "communication network") includes the UAVs 110 and a number of base stations 120 (only one base station shown in FIG. 1A). FIG. 1A further illustrates a communication device 130 and a UAV 140. For example, each of communication device 130 and UAV 140 may include an unauthorized device (e.g., an attacker, an eavesdropper, and/or a malicious user).

The base station 120 may support communication with a single UAV 110 as well as a group of UAVs 110, as shown in FIG. 1A. The mmWave communications between the base station 120 and UAVs 110 may be further improved with RSMA and/or NOMA with beamforming, subcarrier assignment, and/or power allocations. This may further improve metrics such as channel capacity, security, cell-edge throughput, mean throughput, power budget, and efficiency, in the operation (e.g., remote control and other communications) of the UAVs 110 themselves. Thus, the base station 120 may be configured to transmit operational control signals to the UAVs 110 using mmWaves.

The base station 120 may include a number of antennas (e.g., MIMO antennas) (e.g., not shown in FIG. 1A; see antennas 152 of FIG. 1B) configured to generate the mmWave beams (e.g., MIMO beams) (e.g., that are steered toward the sky). Further, according to some embodiments, the base station 120 may include an additional number of antennas configured for communication to one or more land-based communication (e.g., land-based communication devices 170 shown in FIG. 1B) devices. Thus, according to various embodiments, the antennas configured for mmWave communication may be part of a separate mmWave infrastructure added to the base stations 120 that are different from the antennas of the infrastructure configured for communicating with land-based communication devices.

Further, according to some embodiments, the UAVs 110 may include mmWave antennas configured to communicate with each other and/or the base station 120 using mmWave signals. Such cooperative communication among the UAVs may further increase the overall efficiency of the communication system 100 and increase the number of UAVs that may be serviced by the communication system 100 by maintaining the ability to maintain RF coverage for UAVs that do not have line of sight with the base station 120.

In some embodiments, a group of UAVs 110 may be controlled independently from each other in that flight patterns or other control may be independent of the other UAVs 110 of the group. In other embodiments, certain control operations may be dependent on some of the other UAVs 110 of the group. For example, particular flight configurations of the UAVs 110 relative to each other may be maintained to achieve a desired beam pattern responsive to modeling performed to improve performance and/or security of communication with the base station 120 or intra-UAV communication with each other.

In accordance with some embodiments, the mmWave antennas of the base station 120 may be further be configured to identify parameters such as antenna beam pattern and base station density to further adjust (e.g., steer) the mmWave beams generated by the base station 120. The mmWave antennas may be further configured to generate the mmWave beams with RSMA and/or NOMA, particularly when communicating with a group of UAVs 110. This may improve spectral efficiency and reduce information leakage to a malicious user by controlling a set of parameters such as group size, transmission direction, and/or beam width. As a result, the wireless security capacity of the communication system 100 may be improved. As described more fully below, additional embodiments may include protected zone based user scheduling, artificial noise transmission for improving security performance, and dynamic anti-jamming techniques for protecting cellular base station to UAV communication links that may further improve the security for cellular-connected mmWave UAVs.

Figure 1B:
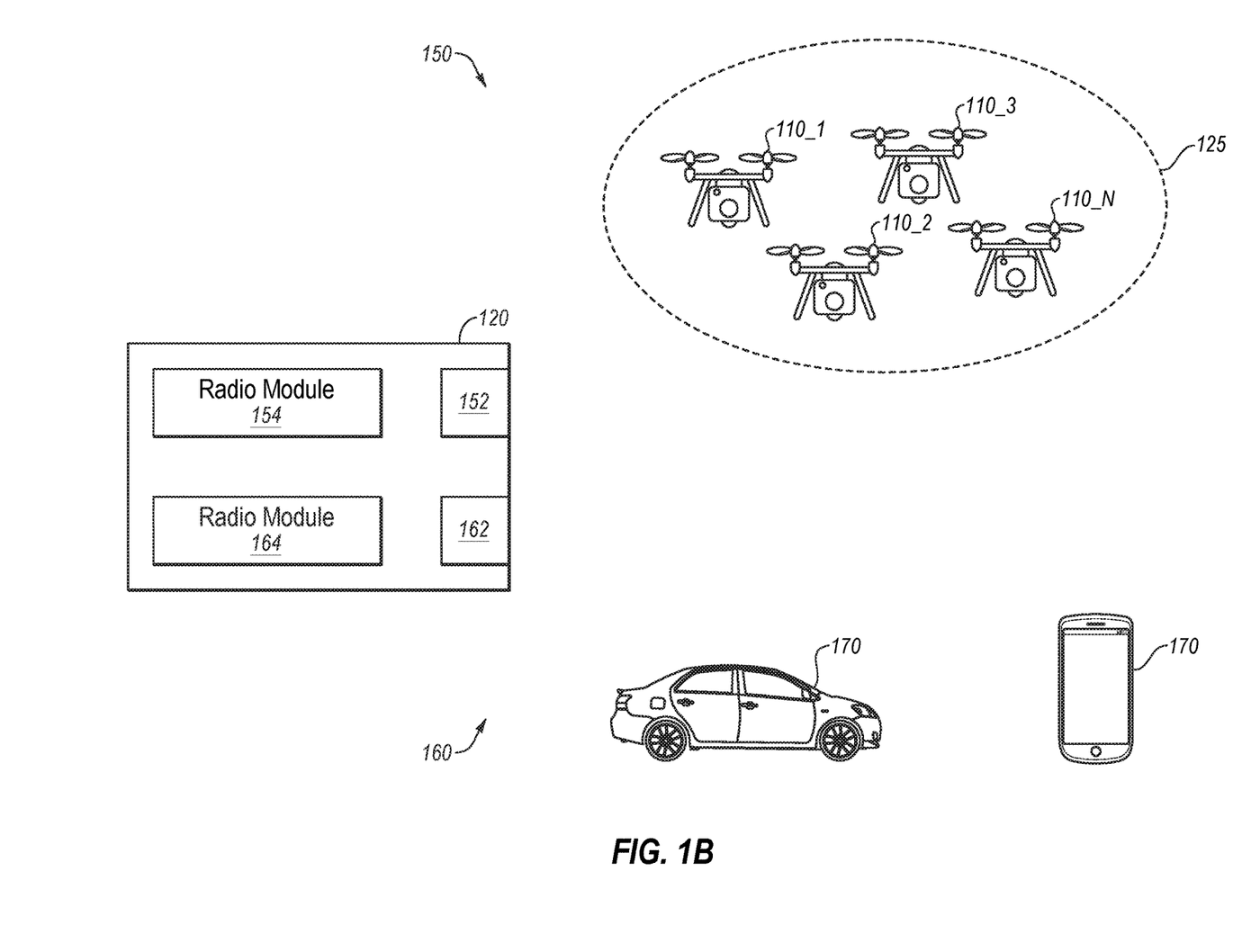
FIG. 1B is another illustration of an example communication system including a number of communication networks, in accordance with various embodiments of the present disclosure.

FIG. 1B is another illustration of an example communication system (mmWave communication network 150), in accordance with various embodiments of the present disclosure. mmWave communication network 150 includes the base station 120, a number of UAVs 110, and the land-based communication devices 170. According to various embodiments, the base station 120 is configured to communicate with UAVs 110 via an mmWave communication network 150, and the base station 120 is configured to communicate with the land-based communication devices 170 via an RF communication network 160. Yet more specifically, in some embodiments, the base station 120 is configured to communicate with the UAVs 110 via one or more antennas 152 (e.g., MIMO antennas) and an associated radio module 154 dedicated to mmWave communication network 150, and base station 120 is configured to communicate with land-based communication devices 170 via one or more antennas 162 and an associated radio module 164 dedicated to RF communication network 160.

According to some embodiments described more fully below, a communication system (e.g., communication network 150) may include one or more control UAVs (e.g., a primary UAV and a second UAV) (also referred to herein as "lead UAVs") configured to communicate with the base station 120. Further, in these embodiments, the communication system may include one or more additional UAVs that are configured to communicate with and/or be controlled by the control UAVs. For example, UAV 110_1 and UAV 110_2 may include a primary UAV and a secondary UAV, respectively, and UAVs 110_3-110_N may include the one or more additional UAVs. In this embodiment, for example, UAVs 110_1 and 110_2 may communicate with the base station 120 and UAVs 110_3-110_N, and UAVs 110_3-110_N may communicate with the base station 120 via UAV 110_1 and/or UAV 110_2.

Further, according to some embodiments, one or more control UAVs of a network (e.g., mmWave communication network 150) may be dynamically selected (e.g., based on conditions of the communication system, including the positions of UAVs within the communication system, condition of one or more communication links of the communication system, and/or any disruption of the communication links of the communication system). In other words, a UAV may be selected as a primary UAV and/or a secondary UAV of a communication network 150 to improve network performance.

Moreover, according to some embodiments, a communication network may be implemented within and/or provide coverage for a UAV corridor (also referred to herein as a "drone corridor"). For example, the mmWave communication network 150 may include and/or may be part of a UAV corridor. In at least these embodiments, spatial separation provided by mmWave beams may reduce interference between RF transmissions toward a UAV corridor (i.e., for drone coverage) and RF transmission toward the ground (e.g., for land-based communication devices).

Further, in some embodiments, a UAV corridor may use the same spectrum band used by land-based communication devices 170. In these embodiments, the base station 120 may include one or more additional mmWave antennas (e.g., antennas 152 and/or antennas 162) and associated radio modules (e.g., radio modules 154 and/or radio modules 164). More specifically, in some embodiments, as noted above, a communication system (e.g., the communication network 150) may include a dedicated number of antennas for a UAV corridor (e.g., for a number of UAVs) (e.g., antennas 152) and another dedicated number of antennas (e.g., antennas 162) for ground use (e.g., for the land-based communication devices 170). These embodiments may enable support for exponential growth of UAV traffic while supporting a large number of users and devices on the ground.

In some embodiments of the disclosure, a communication system (e.g., communication system 100 and/or communication network 150) may include additional mmWave infrastructure to existing communication networks (e.g., through retrofit), such as commercial cellular networks. In other embodiments, new infrastructure may be built to include the mmWave infrastructure described herein as future developments are also implemented.

Further, according to various embodiments, during a contemplated operation of a communication network, one or more UAVs of the communication network may be repositioned (e.g., to improve network performance). For example, in at least one embodiment, a control UAV (e.g., a primary UAV, such as UAV 110_1 of FIG. 1B) may initiate a repositioning process (e.g., via communication with one or more other UAVs and possibly one or more base stations 120), and, as a result, one or more UAVs (e.g., including control UAVs and/or other UAVs) of the communication network may be repositioned. According to some embodiments, a repositioning process may result in updated control UAVs (e.g., a new primary UAV and/or a new secondary UAV) (e.g., to improve performance of the communication network).

As noted above, base station 120 may support communication with a single UAV 110 as well as a group of UAVs 110. In other words, a single mmWave beam may be used to cover (e.g., control) one UAV or a group of UAVs (also referred to herein as a "swarm of UAVs"). Utilizing a single mmWave beam to cover a group of UAVs ("multiple access") instead of a single UAV ("single access") may increase spectral efficiency. In addition, in at least some embodiments, the following approaches may also improve reliability along with spectral efficiency: 1) using a primary UAV and/or a secondary UAV for cellular connectivity with a group of UAVs; 2) having part of the content of a communication common for at least two communication links (e.g., primary and secondary links); and 3) repositioning of one or more UAVs to optimize RF channel conditions (e.g., dynamically selecting the primary UAV and/or the secondary UAV based on conditions of a communication system). Further, according to some embodiments, rate-splitting MA (RSMA) may be used (e.g., rather than non-orthogonal MA (NOMA)) (e.g., for enhanced energy efficiency).

As will be appreciated, security of wireless communication networks, especially for emergency response and other mission critical uses, may be critical. According to various embodiments, in addition to possibly utilizing other known and effective methods to secure UAV communications, a UAV (e.g., UAV 110_1) or a group of UAVs (UAV 110_1-UAV 110_3) may be repositioned (e.g., periodically) to avoid or mitigate any threats. Unlike mobile devices on the ground, movement of a UAV or a group of UAV is not restricted (e.g., to just a road).

As will also be appreciated, UAV operations may be interrupted by malicious jamming or interference from other users and devices both in the air and on the ground. According to some embodiments, one or more UAVs (e.g., a group of UAVs) may operate as relays to enhance the data throughput to other UAVs. In these embodiments, the relay UAVs may follow trajectories to secure data transmission by positioning themselves to minimize both static and dynamic intrusions. For example, UAV 110_1 may operate as a relay UAV, and, in this example, UAV 110_1 may relay signals from the base station 120 to one or more other UAVS (e.g., UAVs 110_2-110_N).

Further, in at least some embodiments, a protected zone that may optimize a secrecy rate may be advantageous along with secrecy-aware beamforming. More specifically, according to some embodiments, a protected zone formed around a region including a group of UAVs (e.g., a region around all UAVs) of a communication network, or around UAVs individually, may improve secrecy rates of the communication network. In these embodiments, malicious users may be prevented from entering the protected zone. For example, peripheral UAVs (e.g., in a group) may be used to create the protected zone. For example, with reference to FIG. 1B, a protected zone 125 may be formed around UAVs 110.

Further, according to some embodiments, artificial noise (AN) may be transmitted by the base station 120 and/or one or more UAVS 110 (e.g., along with confidential messages) to combat malicious receivers (i.e., by steering noise-based jamming). In other embodiments, in addition to or instead of transmitting AN, power leakage may be controlled (e.g., via the base station 120 and/or one or more UAVS 110) into the direction of a malicious receiver. Transmitting AN and/or controlling power leakage may further improve the secrecy rate of a communication network.

Figure 2:
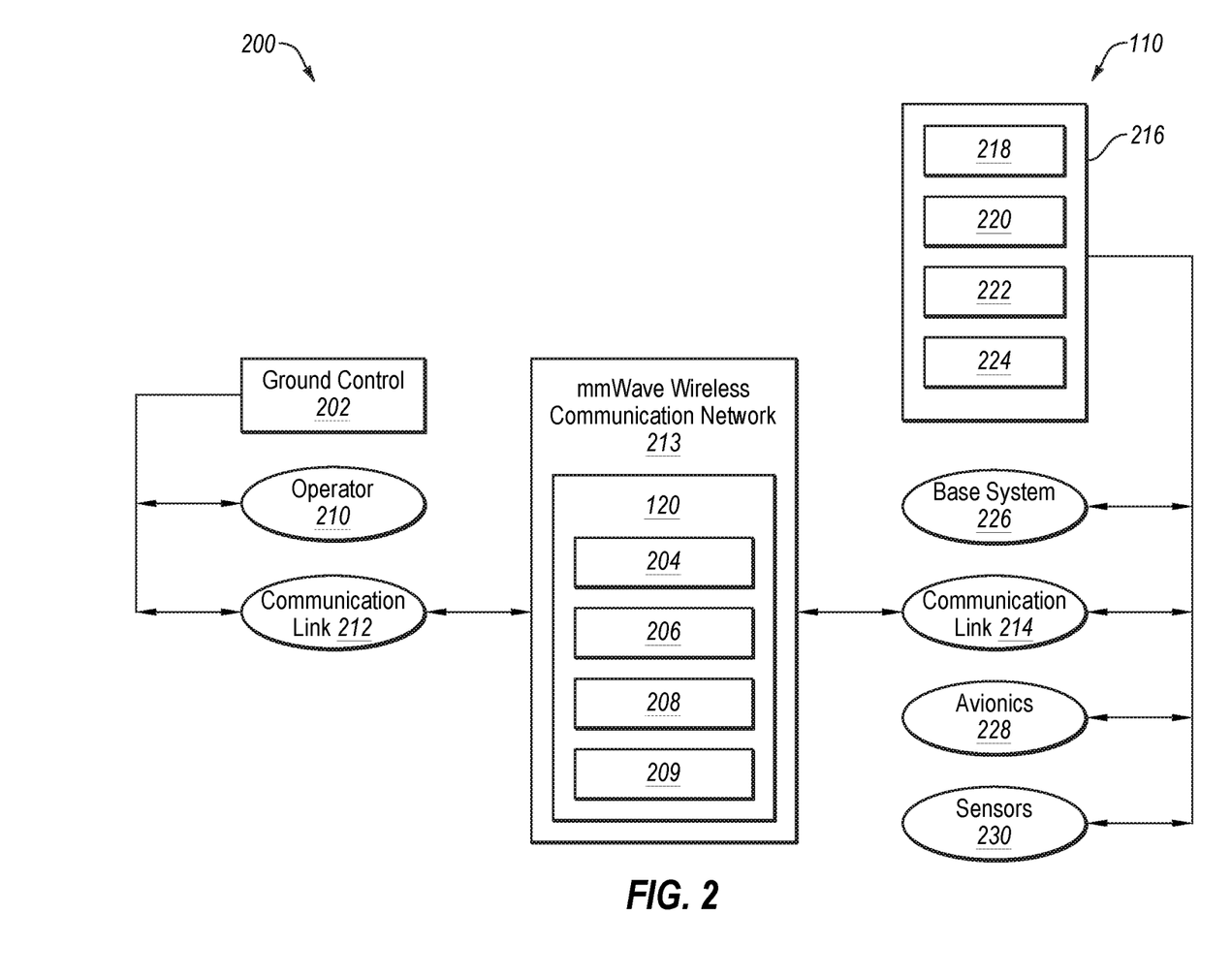
FIG. 2 is a simplified block diagram of an example communication system, according to one or more embodiments of the present disclosure.

FIG. 2 is a simplified block diagram of an example communication system 200 including the base station 120 and a UAV 110, in accordance with one or more embodiments of the present disclosure. The communication system 200 may be configured to provide an End to End (E2E) UAV network for a secure and reliable communication framework between the UAV 110 and the base station 120 using mmWave frequencies. The E2E network shown in FIG. 2 is simplified to show a ground control station 202, one base station 120 (e.g., within an mmWave communication network 213) and one UAV 110; however, any number of ground control stations, any number of base stations and any number of UAVs may be included. In some embodiments, the base station 120 may include hardware elements such as a processor 204, memory 206, communication elements (e.g., modulators, demodulators, transmitters, receivers, etc.) 208, I/O devices 209 for interacting with one or more other components (e.g., an operator 210, the UAV 110, an avionic system 228, sensors, 230, another network, etc.), mmWave antennas (e.g., antennas 152 of FIG. 1B) that may perform beamforming, and other such devices configured to generate and transmit the mmWave signals over a communication link (e.g., a communication link 212 and/or a communication link 214. As discussed above, an mmWave antenna array may be mounted on the base station 120 and tilted upward for improved RF coverage with UAVs located in the sky (e.g., above 400 feet). For example, the main beam of the mmWave antenna array may be steered to cover a single UAV and/or a group of UAVs.

The UAV 110 may also similarly include a controller 216 that includes hardware elements such as a processor 218, memory 220, control elements 222, I/O devices 224, etc. that interface with a base system 226, avionics system 228, and sensors 230. The sensors 230 may be configured to perform data collection depending on the particular application for the UAV 110, such as an image sensor, an air quality sensor, a temperature sensor, nuclear sensors, etc. Other devices and/or payloads carried by the UAV 110 are also contemplated depending on the particular application. The mmWave wireless communication between the base station 120 and the UAV 110 may carry control signals, telemetry data, and other data (e.g., video, audio, sensor data, etc.)

Figure 3:
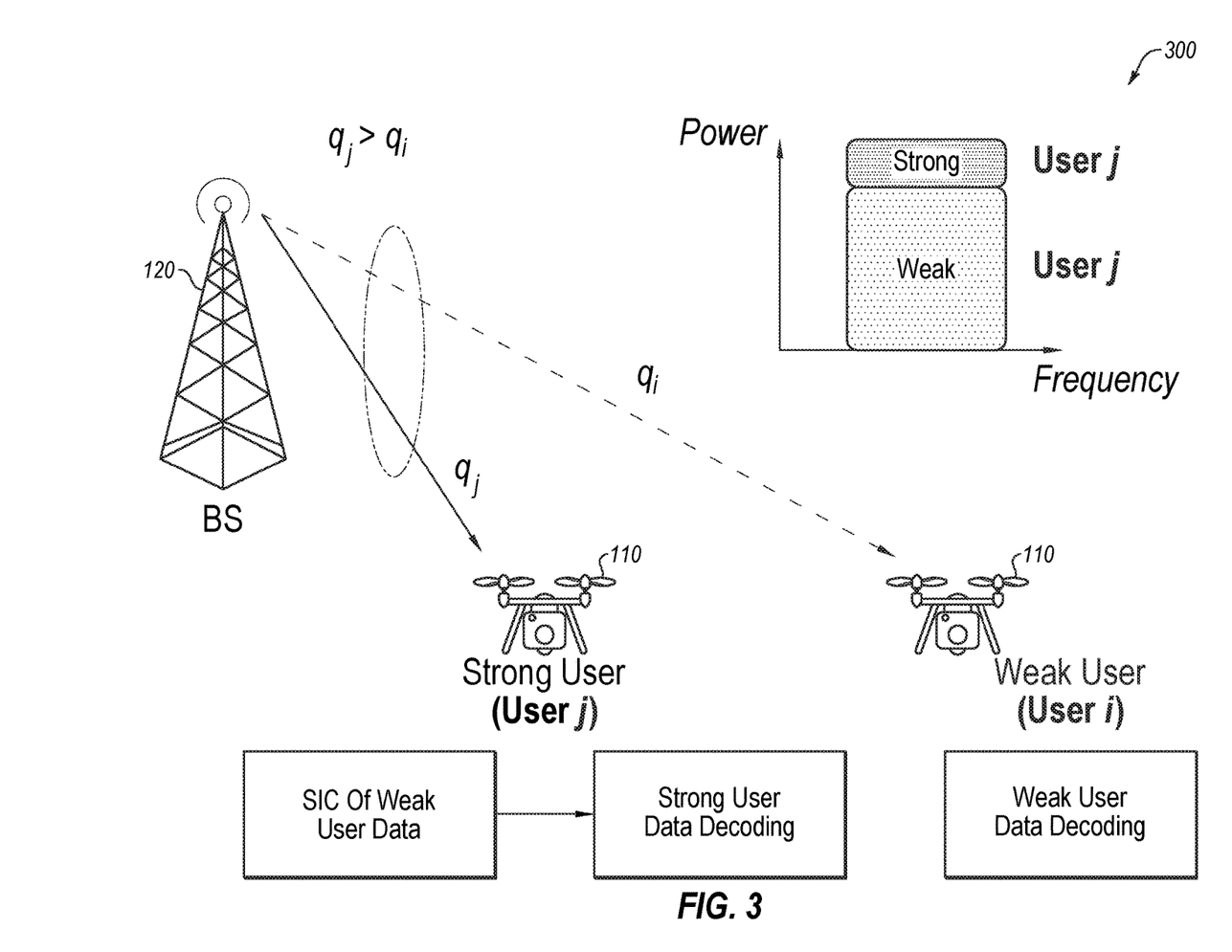
FIG. 3 is a simplified block diagram of an example communication system showing a base station communicating with two or more users, according to various embodiments of the present disclosure.

FIG. 3 is a simplified block diagram of an example communication system 300, according to one or more embodiments of the present disclosure. The communication system 300 illustrates the base station 120 communicating with two (or more) users (UAVs 110) in the same time/frequency/space/code domains with NOMA to improve efficiency. While the stronger user (i.e., user j; proximally closer to the base station 120) may detect and cancel interference due to the weak user (i.e., user i), the weak user may have weak interference, and hence may adopt single user detection.

A problem for scheduling users in NOMA is to collect channel state information (CSI) from each user. Full CSI may be expressed as the effective channel gain from a k-th UAV as:

$$|h_h^H b|^2 \approx \frac{|\alpha_k|^2}{M \times PL\left(\sqrt{d_k^2 + h^2}\right)} \left| \frac{\sin\left(\frac{\pi M(\bar{\theta} - \theta_k)}{2}\right)}{\sin\left(\frac{\pi(\bar{\theta} - \theta_k)}{2}\right)} \right|^2 =$$

$$\frac{\overbrace{|\alpha_k|^2}^{\text{Small scale fading}}}{PL\left(\sqrt{\underbrace{d_k^2}_{\text{Distance}} + h^2}\right)} F_M \overbrace{(\bar{\theta} - \theta_k)}^{\text{Fejer-Kernel}}_{\text{Angle}}$$

where $h_k$ is the channel between the k-th UAV and the serving base station, b is the beamforming vector at the serving base station, $a_k$ is the small scale fading gain, $d_k$ is the horizontal distance with the k-th UAV, h is the height difference between the UAV and the base station, PL(·) refers to path loss for a given mmWave frequency, $\theta_k$ is the angle of departure to k-th UAV, and $F_M$(·) refers to Fejer Kernel (capturing the beam shape).

Because providing the full instantaneous CSI above may be costly, an alternative approach may include providing only distance or angle information as limited feedback. Such approaches may not be as accurate, but may be robust against fading and may not need to be provided as frequently when compared to full CSI.

Figure 4:
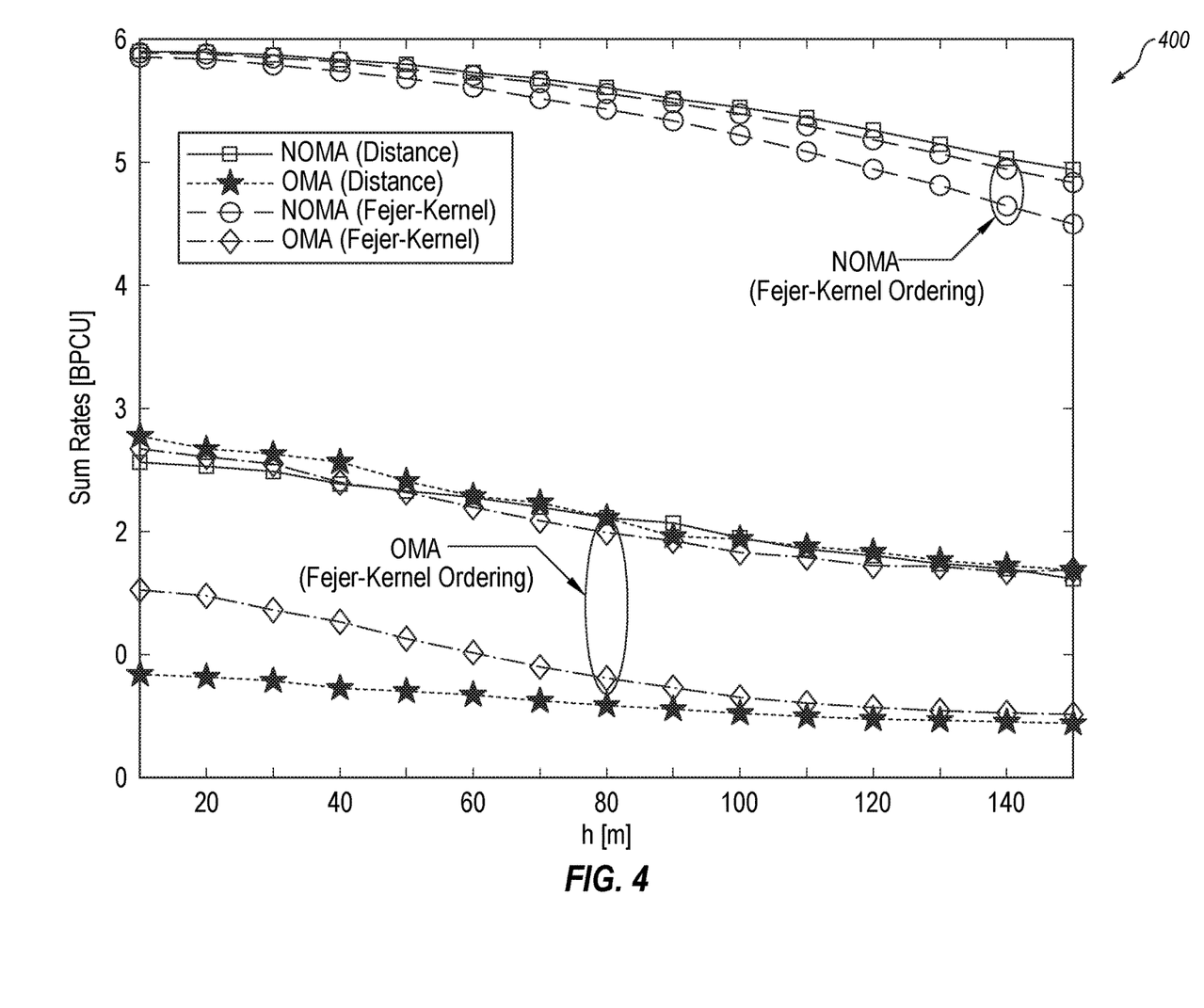
FIG. 4 is a graph showing results of sum rates for various feedback schemes for UAVs configured as mmWave base stations, according to one or more embodiments of the present disclosure.

FIG. 4 is a graph 400 showing results of sum rates for various feedback schemes for UAVs configured as mmWave base stations. In particular, NOMA and orthogonal multiple access (OMA) (e.g., TDMA or FDMA) sum rates are compared under distance and Fejer kernel (angle) based user ordering schemes with i=25, j=20 (weaker/stronger user indices after sorting users with respect to their powers), and $\Delta \in \{1, 5\}$ degrees (mmWave transmit beamwidth). As shown in FIG. 4, NOMA outperforms OMA in the achieved sum rate, and the performance degrades as a function of user height. Moreover, while both ordering schemes produce similar performance for a relatively narrow horizontal beam angle of $\Delta=1$ degree, the Fejer kernel (angular feedback) based ordering achieves much better rate performance for a wider beam angle of $\Delta=5$ degrees, while the distance based ordering results in highly degraded sum rate performance. With distance-based feedback for a wider beamwidth, it may be more likely that the Fejer Kernel may result in values smaller than its true value, which may degrade the overall performance.

When serving a group of UAVs (e.g., UAVs 110 of FIGS. 1A and/or 1B), a base station (e.g., the base station 120) may determine which UAVs within the group are the "best" candidates for coverage with NOMA. Such a determination may be assisted by analyzing ray tracing simulations of the UAVs. In particular, the objective of the base station in selecting the "best" candidate may be to improve a particular performance metric, such as the spectral efficiency or coverage probability. This analysis may also consider factors such as how improving one or more metrics may also impact security constraints, such as reducing the probability of eavesdropping by narrowing the windows of opportunity in both temporal and spatial dimensions. The results may be analyzed to quantify gains from NOMA as compared to the results of using separate time slots for each transmission. Additional analysis of different trade-offs may also be considered in the analysis, such as with various limited feedback schemes for cellular mmWave UAV networks.

Other scheduling problems and/or uplink problems with NOMA transmission for more than two UAVs may also be considered by the base station (e.g., the base station 120). In particular, dynamically clustering highly mobile UAVs into groups of two or more UAVs, to be served (e.g., controlled) simultaneously with NOMA beams, may result in a scheduling problem especially with narrow mmWave beams to achieve long distance coverage. Machine learning techniques and/or artificial intelligence techniques may also be employed for forming the UAV clusters to achieve improved results.

Cooperative intra-UAV communications may also include cooperative NOMA communications for further improvements. The UAVs may be configured to analyze how RF outage at one UAV can be mitigated by setting up alternate paths using one or more UAVs still under full coverage. The UAVs may further be configured to determine if some of the UAVs may serve as relay points for the other UAVs for improved performance.

In some embodiments, an intra-UAV communication phase (e.g., communication between UAVs 110) may follow a primary phase of communication from the mmWave base station (e.g., communication from the base station 120 to one or more UAVs 110). In some embodiments, a selected feedback scheme for signal reception at the UAVs may be used to select transmitters and/or receivers for the second phase of communication (i.e., the intra-UAV communication phase). The outage probability after adding this additional phase may be analyzed to determine the improvement gained in coverage as well as wireless security capacity. In addition, the relay selection for UAVs that are blocked (e.g., temporarily blocked) from direct transmission from the mmWave base station may also be analyzed. In some embodiments, hybrid multiple access (MA) schemes may also be employed during cooperative NOMA intra-UAV communication, in which UAVs may be paired or clustered according to their channel conditions, with NOMA being utilized for communication between UAVs within each group and OMA being utilized for communication between UAVs across the groups. Game theoretic and machine learning techniques may also be employed by the UAVs for resource allocation (e.g., power, bandwidth, time slots) and UAV clustering for improved performance.

Embodiments of the disclosure are not limited to any particular application or deployment environment of using such UAVs unless specifically described as such. It is contemplated that UAVs in a communication system (e.g., communication system 100 of FIG. 1A and/or communication network 150 of FIG. 1B) may be used in a number of applications from personal use (e.g., hobby) to private business use as well as governmental use. Such uses may be well suited for performing remote tasks such as in emergency response (e.g., search and rescue, natural or other disaster response, etc.), surveillance of remote critical infrastructure (e.g., power grids, remote facilities, etc.), and other monitoring activities (e.g., air quality assessments) where communication links with land-based devices may be impaired or otherwise non-existent. Deployment environments such as urban or rural environments are also contemplated. As a more detailed example, UAVs may be configured in an application that assesses damage of an area (e.g., using video surveillance). A group of UAVs configured as described herein may be deployed to provide RF coverage to restore communications for the affected area. The UAVs may be used to recover critical infrastructure, such as a cyber compromised power grid that requires a black restart. Thus, critical communication links to the impaired system may be re-established, including routing communication through the UAVs.

Figure 5:
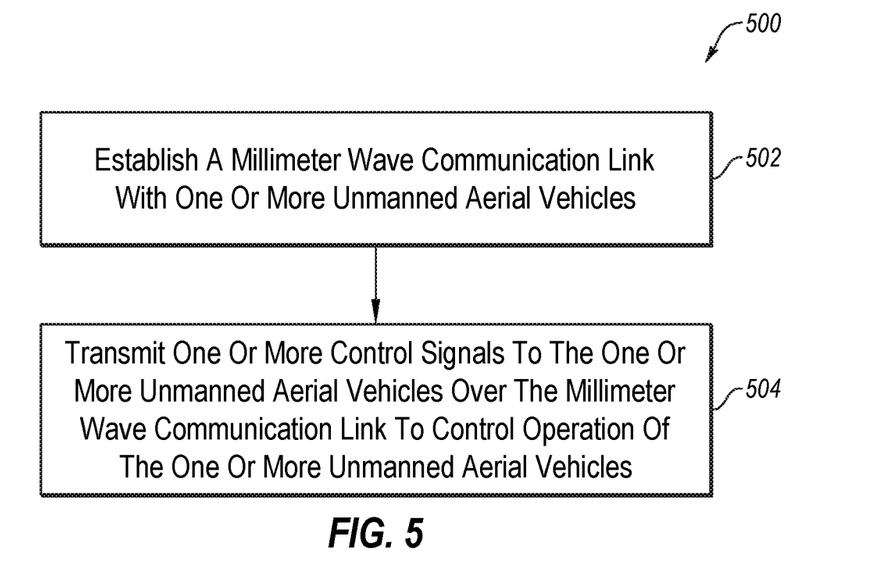
FIG. 5 is a flowchart of an example method of operating a base station, in accordance with various embodiments of the present disclosure.

FIG. 5 is a flowchart of an example method 500 of operating a base station, in accordance with various embodiments of the disclosure. Method 500 may be arranged in accordance with at least one embodiment described in the present disclosure. Method 500 may be performed, in some embodiments, by a device or system, such as communication system 100 of FIG. 1A, communication network 150 of FIG. 1B, communication system 200 of FIG. 2, communication system 300 of FIG. 3, or another device or system. Although illustrated as discrete blocks, various blocks may be divided into additional blocks, combined into fewer blocks, or eliminated, depending on the desired implementation.

Method 500 may begin at block 502, wherein a millimeter wave communication link may be established with one or more unmanned aerial vehicles and method 500 may proceed to block 504. For example, the millimeter wave communication link may be established with a group of unmanned aerial vehicles. Further, in some embodiments, the millimeter wave communication link may be established with the one or more UAVs via one or more antennas dedicated to a millimeter wave communication network.

At block 504, one or more control signals may be transmitted to the one or more unmanned aerial vehicles over the millimeter wave communication link to control operation of the one or unmanned aerial vehicles. For example, in some embodiments, the one or more control signals may be transmitted to the one or more unmanned aerial vehicles via at least one other UAV (e.g., one or more control UAVs, such as a primary UAV and/or a secondary UAV). Further, for example, the one or more control signals may be transmitted as RSMA signals and/or NOMA signals, as described above.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, a method may include one or more acts wherein data (e.g., video and/or telemetry data captured at a UAV) is conveyed from the one or more unmanned aerial vehicles may be received at the base station. Also, data (e.g., video and/or telemetry data) may be transmitted to the one or more unmanned aerial vehicles over the millimeter wave communication link. Further, a method may include one or more acts wherein another communication link may be established with one or more land-based communication devices. Moreover, a method may include one or more acts wherein a UAV may be selected as a control UAV (e.g., a primary UAV or a secondary UAV) based on one or more conditions of a millimeter wave communication network including the millimeter wave communication link.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the present disclosure as hereinafter claimed, including legal equivalents thereof. In addition, features from one embodiment may be combined with features of another embodiment while still being encompassed within the scope of the present disclosure.

Additional non-limiting embodiments of the disclosure include: Embodiment 1: A base station, comprising: a first number of radio modules and antennas configured for communication with a number of unmanned aerial vehicles (UAVs) via a millimeter wave (mmWave) network; and a second number of radio modules and antennas configured for communication with land-based communication devices via a radio-frequency (RF) network.

Embodiment 2: The base station of Embodiment 1, wherein the first number of antennas comprises multiple-input multiple-output (MIMO) antennas configured to generate mmWave beams.

Embodiment 3: The base station of Embodiment 1 or Embodiment 2, wherein the first number of antennas is configured to transmit beams in the mmWave network and the second number of antennas is configured to transmit beams in the RF network.

Embodiment 4: The base station of any of Embodiments 1 through 3, wherein the first number of antennas are configured to transmit beams in a first direction toward at least one UAV of the number of UAVs and the second number of antennas are configured to transmit beams in a second direction toward at least one land-based communication device of the number of land-based communication devices.

Embodiment 5: The base station of any of Embodiments 1 through 4, wherein the first number of radio modules and antennas are configured to transmit at least one control signal to the number of UAVs via rate-splitting multiple access or non-orthogonal multiple access.

Embodiment 6: The base station of any of Embodiments 1 through 5, wherein the first number of radio modules and antennas are configured to receive data from the number of UAVs.

Embodiment 7: The base station of any of Embodiments 1 through 6, wherein the number of UAVs at least one control UAV and one or more other UAVs.

What is claimed is:
1. A communication system, comprising:
a plurality of unmanned aerial vehicles (UAVs); and
one or more base stations including:
a first number of millimeter wave (mmWave) antennas configured to generate and wirelessly transmit control signals in a first direction to one or more UAVs of the plurality of UAVs over a mmWave communication network, wherein the control signals are at least partially based on a base station density; and
a second number of antennas configured to generate and transmit signals in a second direction to land-based communication devices;

wherein at least one base station of the one or more base stations is configured to control at least two UAVs of the plurality of UAVs via a single mmWave beam;

wherein the one or more base stations are configured to select a UAV of the plurality of UAVs for non-orthogonal multiple access (NOMA) communication based on ray tracing simulations of the plurality of UAVs;

wherein the plurality of UAVs include a primary UAV and at least one secondary UAV, wherein the primary UAV is dynamically selected based on one or more conditions of the communication system;

wherein at least one of a base station of the one or more base stations or at least one UAV of the plurality of UAVs is configured to transmit artificial noise with a confidential message and control power leakage in a direction of a malicious receiver.

2. The communication system of claim 1, wherein the one or more base stations are configured to control the first number of mmWave antennas to perform beamforming when generating the control signals.

3. The communication system of claim 1, wherein the one or more base stations are configured to receive mmWave communications from the one or more UAVs.

4. The communication system of claim 1, wherein the one or more base stations are configured to transmit the control signals as one of rate-splitting multiple access (RSMA) signals and non-orthogonal multiple access (NOMA) mmWave signals when communicating with a number of UAVs of the one or more UAVs.

5. The communication system of claim 1, wherein the second number of antennas are configured to communicate with the land-based communication devices over a different radio-frequency (RF) network.

6. The communication system of claim 1, wherein the first number of mmWave antennas are dedicated for UAVs including the plurality of UAVs.

7. The communication system of claim 1, wherein the plurality of UAVs further comprise at least one additional UAV, wherein the at least one additional UAV is configured to communicate with the one or more base stations via at least one of the primary UAV and the at least one secondary UAV.

8. An unmanned aerial vehicle, comprising:
a processor and transmitter configured to:
wirelessly communicate with a base station over a millimeter wave (mmWave) network; and
directly communicate with other unmanned aerial vehicles via the mmWave network;
wherein the unmanned aerial vehicle (UAV) is configured to:
be dynamically selected and operate as a primary UAV based on one or more conditions of the mmWave network;
be dynamically selected and operate as a secondary UAV based on the one or more conditions of the mmWave network; and
transmit artificial noise with a confidential message and control power leakage in a direction of a malicious receiver.

9. The unmanned aerial vehicle of claim 8, wherein the processor and transmitter are further configured to transmit at least one of video data and telemetry data to the base station via the mmWave network.

10. A method of operating a base station, the method comprising:
establishing a millimeter wave (mmWave) communication link with a plurality of unmanned aerial vehicle (UAVs);
selecting, via the base station, a UAV of the plurality of UAVs for non-orthogonal multiple access (NOMA) communication based on ray tracing simulations of the plurality of UAVs;
wirelessly transmitting a single mmWave beam to at least two UAVs of the plurality of UAVs over the mmWave communication link to control operation of each of the at least two UAVs;
at least one of wirelessly transmitting artificial noise with the single mmWave beam and controlling power leakage in a desired direction;
dynamically selecting one UAV of the plurality of UAVs as a primary UAV based on one or more conditions of an mmWave communication network including the base station and the plurality of UAVs; and
dynamically selecting another UAV of the plurality of UAVs as a secondary UAV based on the one or more conditions of the mmWave communication network.

11. The method of claim 10, further comprising receiving data from at least one UAV of the plurality of UAVs at the base station.

12. The method of claim 11, wherein receiving data comprises receiving at least one of video and telemetry data from the at least one UAV at the base station.

13. The method of claim 10, further comprising wirelessly transmitting a number of control signals to the plurality of UAVs over respective mmWave communication links to control operation of each UAV of the plurality of UAVs.

14. The method of claim 13, further comprising receiving data from the plurality of UAVs at the base station, the data comprising at least one of video data and telemetry data.

15. The method of claim 10, further comprising wirelessly transmitting one or more control signals to an additional UAV via at least one of the primary UAV or a secondary UAV.

16. The method of claim 15, further comprising dynamically selecting another UAV of the plurality of UAVs as a secondary UAV based on one or more conditions of the mmWave communication network.

17. The method of claim 10, further comprising establishing a radio-frequency (RF) communication link with at least one land-based communication device.

18. The method of claim 17, wherein establishing the mmWave communication link with the plurality of UAVs comprises establishing the mmWave communication link via one or more antennas dedicated to an mmWave communication network, and wherein establishing the RF communication link with the at least one land-based communication device comprises establishing the RF communication link via one or more other antennas dedicated to an RF communication network.

19. The unmanned aerial vehicle of claim 8, wherein the UAV is configured to initiate a repositioning process to reposition one or more other UAVs while operating as the primary UAV.

* * * * *

UNITED STATES PATENT AND TRADEMARK OFFICE
CERTIFICATE OF CORRECTION

PATENT NO. : 12,265,385 B2
APPLICATION NO. : 17/309127
DATED : April 1, 2025
INVENTOR(S) : Arupjyoti Bhuyan, Ismail Guvenc and Huaiyu Dai Page 1 of 1

It is certified that error appears in the above-identified patent and that said Letters Patent is hereby corrected as shown below:

In the Specification

Column 9, Line 20, change "$|h_h^H b|^2 \approx$," to --$|\boldsymbol{h}_k^H \boldsymbol{b}|^2 \approx$--

Signed and Sealed this
Twenty-sixth Day of August, 2025

Coke Morgan Stewart
*Acting Director of the United States Patent and Trademark Office*